(12) United States Patent
Yamashiro (10) Patent No.: US 12,151,369 B2
(45) Date of Patent: Nov. 26, 2024

(54) SEPARATOR PLATE AND PROTECTION MEMBER FOR WIRE MEMBER

(71) Applicant: FANUC CORPORATION, Yamanashi (JP)

(72) Inventor: Hikaru Yamashiro, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/032,230

(22) PCT Filed: Nov. 8, 2021

(86) PCT No.: PCT/JP2021/040950
§ 371 (c)(1),
(2) Date: Apr. 17, 2023

(87) PCT Pub. No.: WO2022/102567
PCT Pub. Date: May 19, 2022

(65) Prior Publication Data
US 2023/0390950 A1    Dec. 7, 2023

(30) Foreign Application Priority Data

Nov. 12, 2020   (JP) ................................. 2020-188604

(51) Int. Cl.
*B25J 19/00*    (2006.01)
(52) U.S. Cl.
CPC .................................. *B25J 19/0029* (2013.01)
(58) Field of Classification Search
CPC ..................................................... B25J 19/0029
See application file for complete search history.

(56) References Cited

U.S. PATENT DOCUMENTS

| 4,906,121 A | 3/1990 | Torii et al. |
| 11,117,269 B2 * | 9/2021 | Inoue ..................... B25J 9/0009 |

(Continued)

FOREIGN PATENT DOCUMENTS

| JP | S62-136392 A | 6/1987 |
| JP | H5-172660 A | 7/1993 |

(Continued)

OTHER PUBLICATIONS

International Search Report issued in PCT/JP2021/040950 mailed on Dec. 21, 2021 with English Translation (5 pages).

(Continued)

*Primary Examiner* — Charles A Fox
*Assistant Examiner* — Gregory T Prather
(74) *Attorney, Agent, or Firm* — Nakanishi IP Associates, LLC (57) ABSTRACT

A separator plate is used to separate a cable from structural parts housed in a casing. The back surface side of the separator plate facing a structural part is provided with a concave portion to fit to the structural part. The front surface side of the separator plate facing a cover of the casing is provided with a groove for accommodating and routing the cable. The groove is formed by making a portion on the front surface side that avoids a protrusion on the surface side due to the concave portion provided on the back surface side protrude toward the cover of the casing.

8 Claims, 9 Drawing Sheets

(56) References Cited

U.S. PATENT DOCUMENTS

2010/0237178 A1* 9/2010 Nakamura ........... B25J 19/0029
                                                            242/388.9
2020/0016755 A1   1/2020 Harada et al.

FOREIGN PATENT DOCUMENTS

| JP | 2010-264525 A | 11/2010 |
| JP | 2020-011303 A | 1/2020 |

OTHER PUBLICATIONS

Written Opinion of International Searching Authority issued in PCT/JP2021/040950 mailed on Dec. 21, 2021 with English Translation (5 pages).

* cited by examiner

SEPARATOR PLATE AND PROTECTION MEMBER FOR WIRE MEMBER

TECHNICAL FIELD

The present invention relates to a separator plate and a protection member for a wire member.

BACKGROUND ART

In recent years, improvements in robot technology have led to the use of robots in various fields. Accordingly, many demands have been made on robot manufacturers. Among many demands, demands for miniaturization and slimming down of robots are increasing every year. The miniaturization and slimming down of the entire robot narrow the space for passing a cable inside the mechanism, making it difficult to pass a sheathed cable. Cables with bare insulation without sheaths are more vulnerable to physical contact than sheathed cables, and need to be protected against internal structural parts of the robot mechanism.

CITATION LIST

Patent Literature

Patent Literature 1: Japanese Unexamined Patent Application Publication No. 2010-264525

Figure 17:
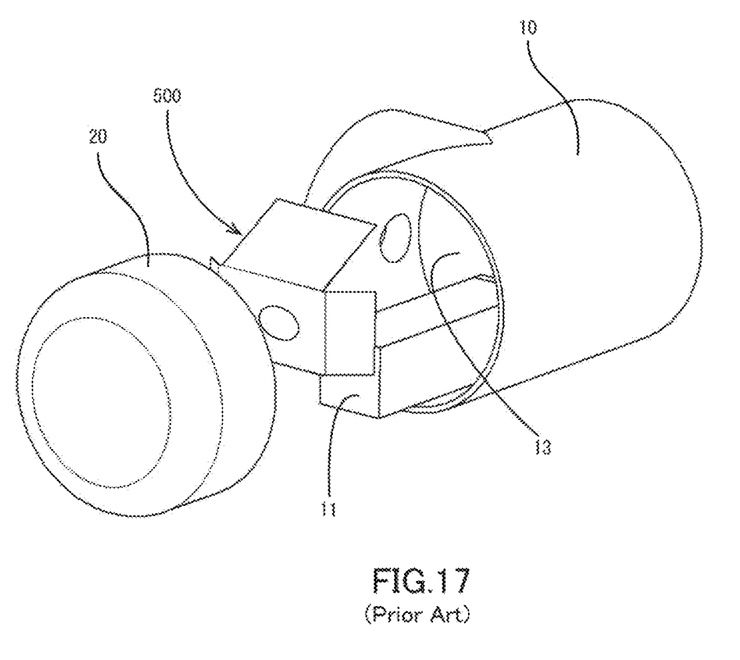
FIG. 17 is a perspective view showing a conventional example.

As one method for protecting a cable, a technique using a guide tube is known (for example, Patent Literature 1). Another method is to attach a thin resin sheet 500 to the inside of a casing 10 to separate a cable from internal structural parts 11 and 13, as shown in FIG. 17. However, the method of attaching the thin resin sheet has poor workability since it is difficult to shape the thin resin sheet to conform to the internal structural parts. In addition, when a connector of a cable needs to be fixed, a worker pushes the connector into an empty space in a narrow space and fix it, or the like, and cable forming may vary depending on the skill and understanding level of the worker. Variations in cable forming create a risk of pinching a sheet or cable when attaching a casing cover to a casing. Therefore, it is desired to protect the cable wired inside the robot mechanism, as well as to improve the workability of the cable wiring work by the worker and to achieve uniform quality of the robot.

DETAILED DESCRIPTION

A separator plate according to one aspect of the present disclosure is applied to a robot component comprising a casing, a structural part housed in the casing, and a cover of the casing. The separator plate is used to separate a cable from the structural part. A back surface side of the separator plate facing the structural part is provided with a concave portion and a convex portion to fit to the structural part. A front surface side of the separator plate facing the cover of the casing is provided with a groove to accommodate and route the cable. The groove is formed by making a portion on the front surface side that avoids a protrusion on the front surface side due to the concave portion provided on the back surface side protrude toward the cover of the casing.

Hereinafter, a separator plate according to a first embodiment and a protection member for a wire member according to a second embodiment will be described with reference to the drawings. Both the separator plate and the protection member for the wire member are used to protect a wire member wired inside a robot mechanism against a structural part housed inside the robot mechanism. In the first and second embodiments, the wire member will be described as a cable. However, the wire member is not limited to the cable. The wire member may be a tube, a wire, or the like as long as it is wired inside the robot mechanism. In the first and second embodiments, cable wiring to the inside of a joint of a robot will be described as an example. However, the separator plate and the protection member for the wire member can be applied to any part of the components of the robot as long as it is a part inside a robot mechanism where a wire member is wired.

In the following description, constituent elements having substantially the same function and configuration are denoted by the same reference numeral, and repetitive descriptions will be given only where necessary.

First Embodiment

As shown in FIGS. 1 to 5, a joint 1 of a robot includes a casing 10 having a circular cylindrical shape, first and second structural parts 11 and 13 housed in the casing 10, and a casing cover 20 that covers the casing 10. Insertion holes 15 and 17 for inserting a cable 200 is formed in the side and bottom surfaces of the casing 10. The cable 200 is introduced into the casing 10 through the insertion hole 15 in the side surface of the casing 10, routed inside the casing 10 by a separator plate 3, and drawn out of the casing 10 through the insertion hole 17 in the bottom surface of the casing 10. The first and second structural parts 11 and 13 may be any structures inside the robot mechanism. Examples of the first and second structural parts 11 and 13 are a motor, a reduction gear, a gear, a shaft, a motor driver, and the like. Here, the first structural part 11 protrudes more toward the casing cover 20 than the second structural part 13. Its protruding length is D. The separator plate 3 according to the first embodiment is a member for separating the cable 200 from the first and second structural parts 11 and 13. By physically separating the cable 200 from the first and second structural parts 11 and 13 with the separator plate 3, the risk of the cable 200 being rubbed against and damaged by the first and second structural parts 11 and 13 can be avoided.

A specific aspect of the separator plate 3 according to the first embodiment will be described below with reference to FIGS. 3 to 8.

The separator plate 3 is a plate-like member having a planar shape that conforms to the transverse sectional shape of the casing 10. Hereinafter, for clarity of explanation, the surface of the separator plate 3 facing the casing cover 20 will be referred to as the front surface, and the surface of the separator plate 3 facing the first and second structural parts 11 and 13 will be referred to as the back surface.

Typically, the separator plate 3 is integrally molded of a hard resin. By forming the separator plate 3 by molding, a structure for fitting to the first structural part 11 can be easily formed, and the manufacturing cost can be reduced. Further, by providing the separator plate 3 with hardness, variations in the mounting position of the separator plate 3 by the worker can be suppressed, and the separator plate 3 can be easily and reliably mounted inside the casing 10.

The separator plate 3 may be made of a resin that is transparent to visible light or may be made of a resin that is not transparent to visible light. Any material may be selected based on the respective actions and effects to be described below. When the separator plate 3 is transparent or semi-transparent, the worker can visually confirm the fitting state of the separator plate 3 to the first and second structural parts 11 and 13. This improves the workability of the mounting work of the separator plate 3. This also contributes to improvement in the workability of the maintenance work since the states of the first and second structural parts 11 and 13 can be visually confirmed with the separator plate 3 mounted. On the other hand, when the separator plate 3 is opaque, the separator plate 3 makes the first and second structural parts 11 and 13 invisible. This highlights the cable 200 wired along a groove of the separator plate 3, making it easier to visually confirm the wiring state of the cable 200 and improving the workability of the wiring work of the cable 200.

A through hole 35 is formed in the center of the separator plate 3 for passing the cable 200, which is wired along a groove 33 provided in the front surface of the separator plate 3, from the front surface side to the back surface side of the separator plate 3. When the cable 200 needs to be wired only on the front surface side of the separator plate 3, the through hole 35 is unnecessary.

The back surface side of the separator plate 3 is provided with a concavity and a convexity that fit to the structural parts. In the first embodiment, a back surface portion of the separator plate 3 facing the first structural part 11 is provided with a concave portion 31a that fits to the first structural part 11. When viewed from the casing 10, the concave portion 31a is recessed toward the casing cover 20. In such a case, a back surface portion facing the first structural part 11 on the back surface side of the separator plate 3 corresponds to the concave portion, and a back surface portion facing the second structural part 13 corresponds to the convex portion. Typically, the concave portion 31a has an inner shape that conforms to the transverse sectional shape of the first structural part 11, and the depth thereof is equivalent to the protruding length D of the first structural part 11 with respect to the second structural part 13, with reference to the height of the back surface portion of the separator plate 3 facing the second structural part 13. Thus, the worker only has to place the separator plate 3 so that the concave portion 31a is aligned with the first structural part 11 and push the separator plate 3 toward the first and second structural parts 11 and 13 to fit the concave portion 31a to the first structural part 11, thereby fixing the position of the separator plate 3 inside the casing 10. By providing the separator plate 3 with a structure that can be fitted to the structural parts 11 and 13 housed in the casing 10, variations in the mounting position of the separator plate 3 by the worker can be suppressed, and uniform quality can be achieved. In addition, the concave portion 31a also functions as a guide for mounting the separator plate 3 inside the casing 10 during the mounting work of the separator plate 3; therefore, the workability of the mounting work of the separator plate 3 by the worker can be improved. In addition, a fastener such as a bolt for fixing the separator plate 3 to the casing 10 or the first and second structural parts 11 and 13 is not required; therefore, the number of components can be reduced and the working process can be shortened.

In the above-described structure, the separator plate 3 does not move in a direction perpendicular to the direction in which the separator plate 3 is pushed toward the first and second structural parts 11 and 13, but the separator plate 3 may come off the first and second structural parts 11 and 13. Therefore, in order to completely fix the position of the separator plate 3 inside the casing 10, the concave portion 31a may be configured to be slightly smaller than the transverse sectional shape of the first structural part 11, and the separator plate 3 may be press-fitted toward the first and second structural parts 11 and 13 to be mounted. Alternatively, the outer peripheral surface of the separator plate 3 or the inner peripheral surface of the concave portion 31a may be provided with an engaging claw or a receiving portion for receiving an engaging claw, and the inner peripheral surface of the casing 10 or the outer peripheral surface of the first structural part 11 may be provided with a receiving portion for receiving an engaging claw or an engaging claw, so that the position of the separator plate 3 inside the casing 10 is completely fixed by engagement of the claw.

In addition, the concave portion 31a need not be completely fitted to the first structural part 11, and the shape thereof is not limited to the above as long as the position of the separator plate 3 can be fixed in the direction perpendicular to the direction in which the separator plate 3 is pushed toward the first and second structural parts 11 and 13. If there are at least two points of contact between the inner surface of the concave portion 31a and the outer surface of the first structural part 11 on a plane perpendicular to the direction in which the separator plate 3 is pushed toward the first and second structural parts 11 and 13, the separator plate 3 never moves in the direction perpendicular to the direction in which the separator plate 3 is pushed toward the first and second structural parts 11 and 13. Therefore, the inner shape of the concave portion 31a may be any shape as long as there are at least two points of contact between the inner surface of the concave portion 31a and the outer surface of the first structural part 11 on the plane perpendicular to the direction in which the separator plate 3 is pushed toward the first and second structural parts 11 and 13.

The separator plate 3 may have two or more concave portions in accordance with the number of structural parts housed in the casing 10, On the front surface side of the separator plate 3, the groove 33 is provided as a cable accommodating portion for accommodating and routing the cable 200. From the viewpoint of workability for accommodating and routing the cable 200 and moldability, the cable accommodating portion is typically the groove 33, but the separator plate 3 may be provided with an insertion hole for inserting the cable 200 or a cable clip along the cable route as the cable accommodating portion. The groove 33 is formed by a portion on the front surface side of the separator plate 3 protruding toward the cover of the casing. Although the groove 33 may have any shape and length depending on the cable route, it is desirable that a protrusion 32b constituting the groove 33 is formed to avoid a protrusion 31b (also referred to as a bottomed-hollow-pillar structure) on the front surface side due to the concave portion 31a provided on the back surface side of the separator plate 3. This reduces the thickness of the separator plate 3, and suppresses the increase in size of the joint 1 due to the introduction of the separator plate 3.

In the first embodiment, the groove 33 is configured to be connected at one end to the insertion hole 15 in the side surface of the casing 10, curved to bypass the through hole 35 in the center of the separator plate 3, and reaches at the other end a position close to the through hole 35 in the center of the separator plate 3. In this way, by providing the groove 33 for routing the cable 200 on the front surface side of the separator plate 3, even when the cable 200 moves inside the joint 1 as the joint 1 moves, the risk of the cable 200 being brought into contact with and damaged by the first and second structural parts 11 and 13 can be reduced because the cable 200 is physically separated from the first and second structural parts 11 and 13. In addition, the worker only has to wire the cable 200 along the groove 33, and variations in the routing of the cable 200 by the worker can be suppressed, thereby realizing uniform quality. The transverse sectional shape of the groove 33 is typically a rectangle, but may be a trapezoidal shape in which the groove width narrows toward the bottom. This prevents the cable 200 accommodated in the groove 33 from easily coming out of the groove 33.

Figure 1:
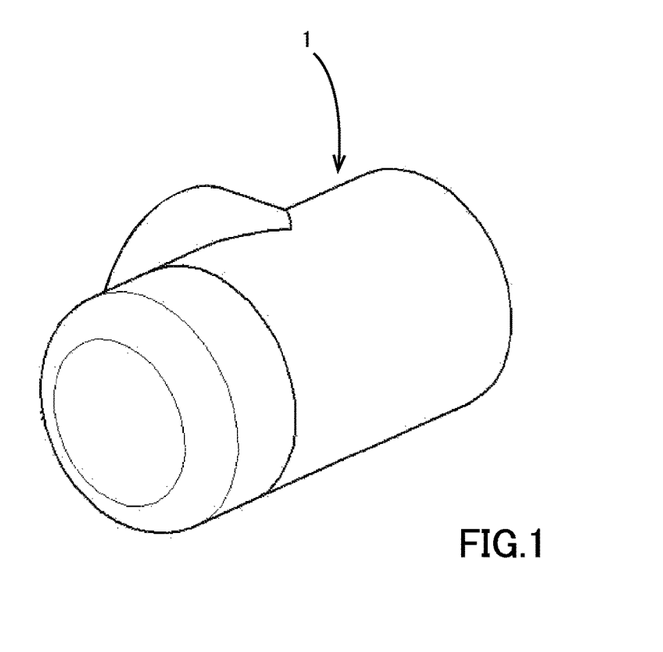
FIG. 1 is an external view of a joint of a robot.
Figure 2:
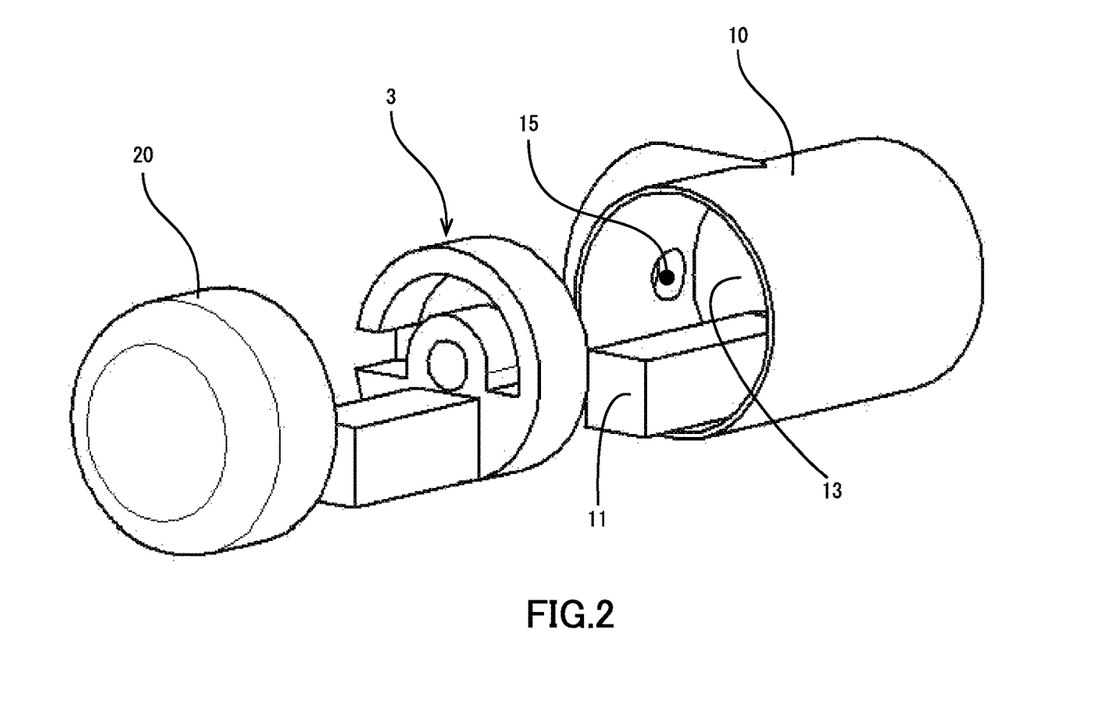
FIG. 2 is a perspective view showing a separator plate according to a first embodiment in a state where the joint of the robot shown in FIG. 1 is disassembled.
Figure 3:
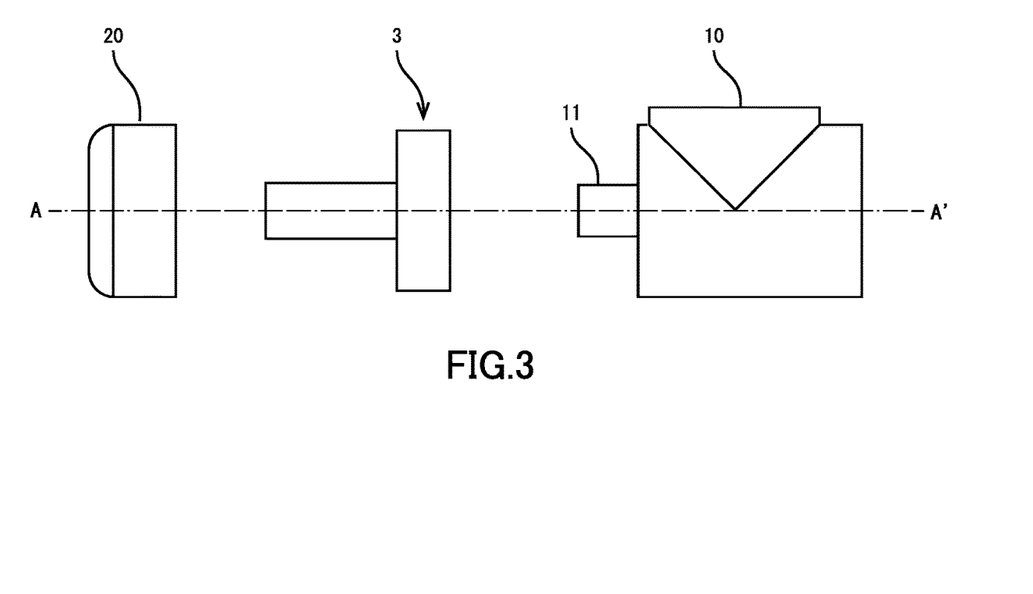
FIG. 3 is a plan view showing the separator plate according to the first embodiment in a state where the joint of the robot shown in FIG. 1 is disassembled.
Figure 4:
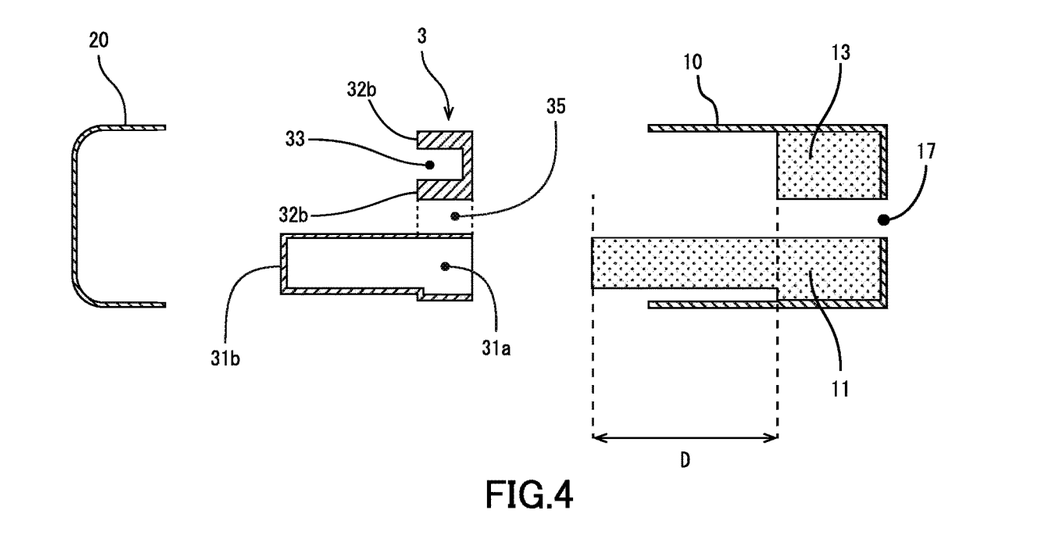
FIG. 4 is a cross-sectional view taken along line A-A' in FIG. 3.
Figure 5:
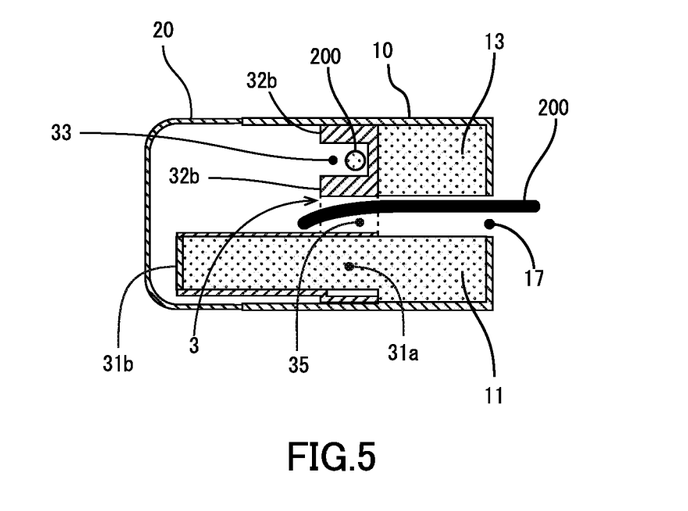
FIG. 5 is a cross-sectional view showing the separator plate mounted inside the joint of the robot shown in FIG. 1, together with a cable.
Figure 6:
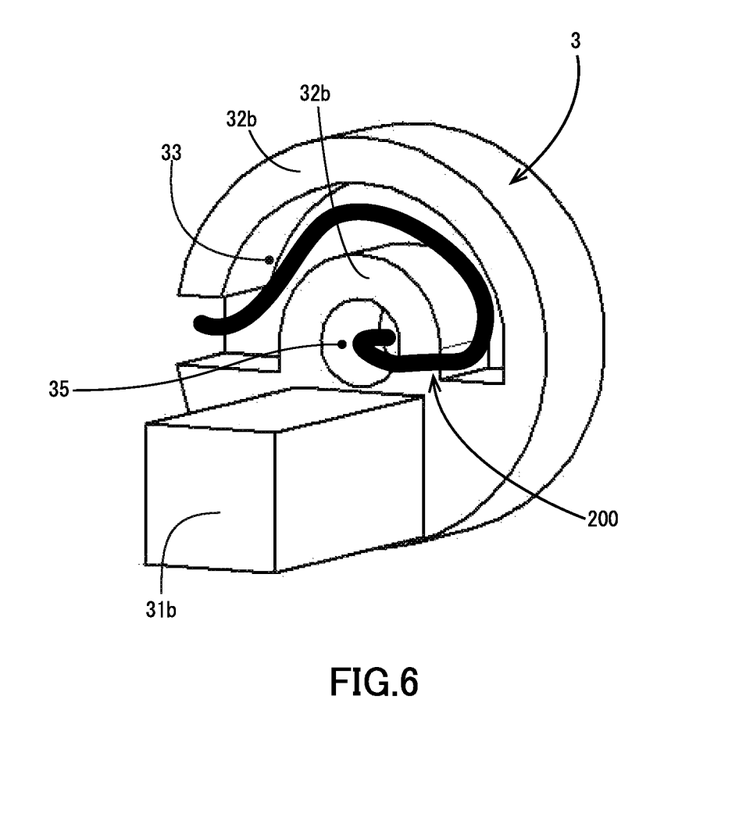
FIG. 6 is a perspective view showing a cable wired along a groove of the separator plate shown in FIG. 2.
Figure 7:
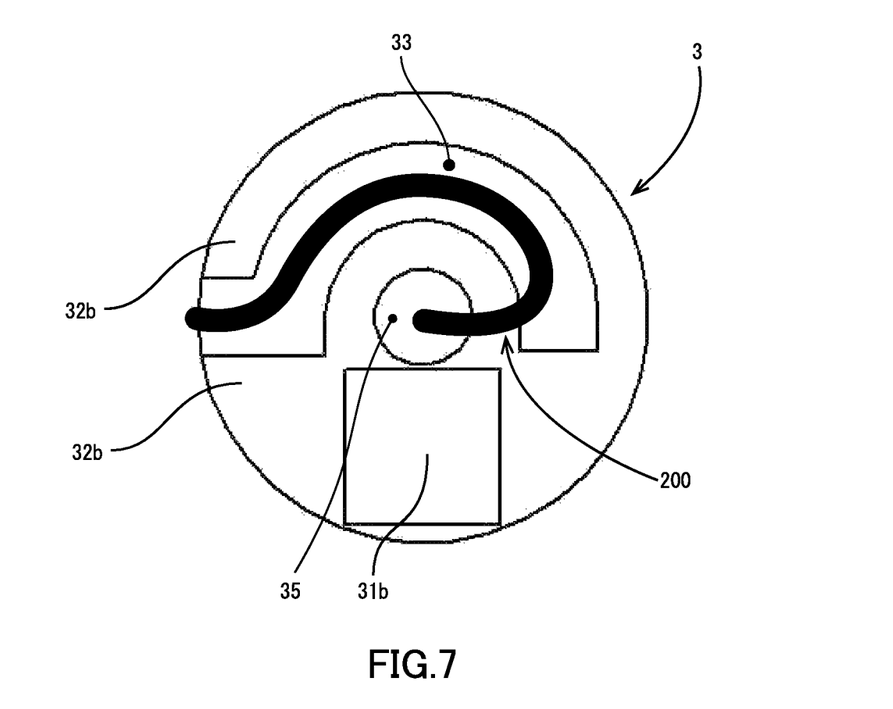
FIG. 7 is a plan view showing a cable wired along the groove of the separator plate shown in FIG. 2.
Figure 8:
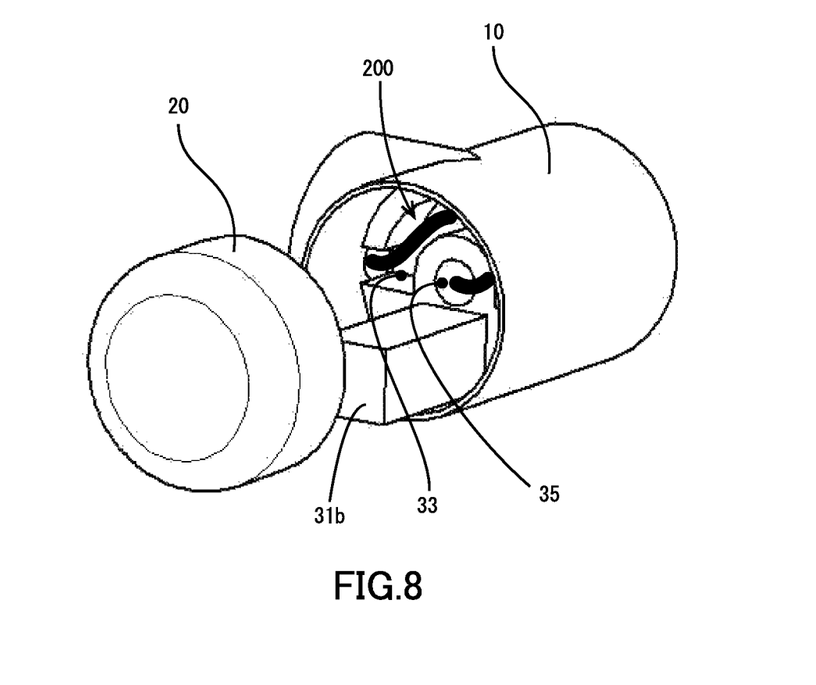
FIG. 8 is a perspective view showing a state where the separator plate shown in FIG. 2 is mounted inside a casing and a cable is wired.
Figure 9:
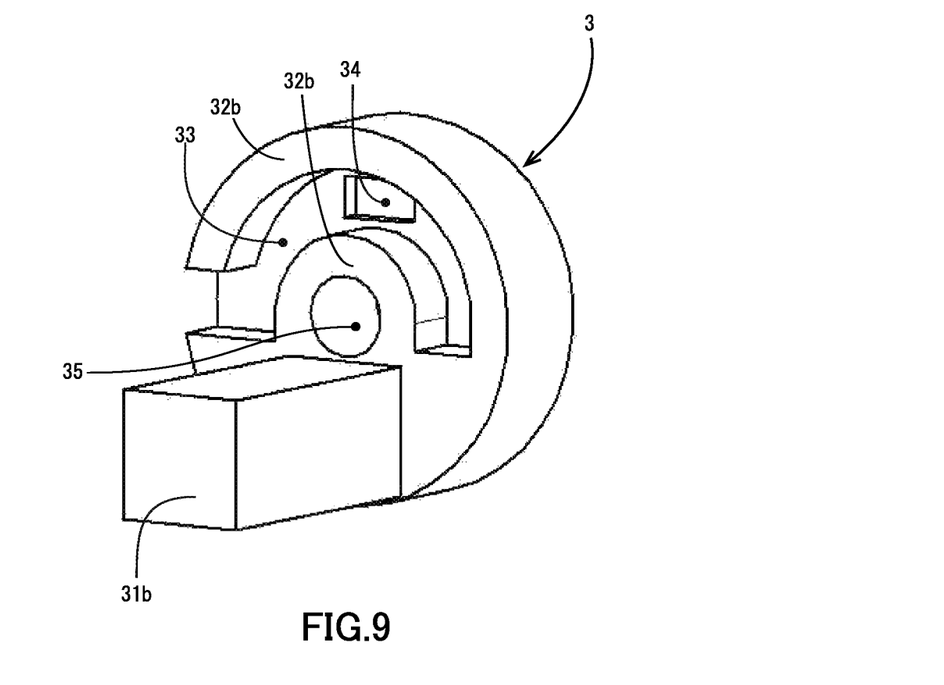
FIG. 9 is a perspective view showing a separator plate according to a modification of the first embodiment.
Figure 10:
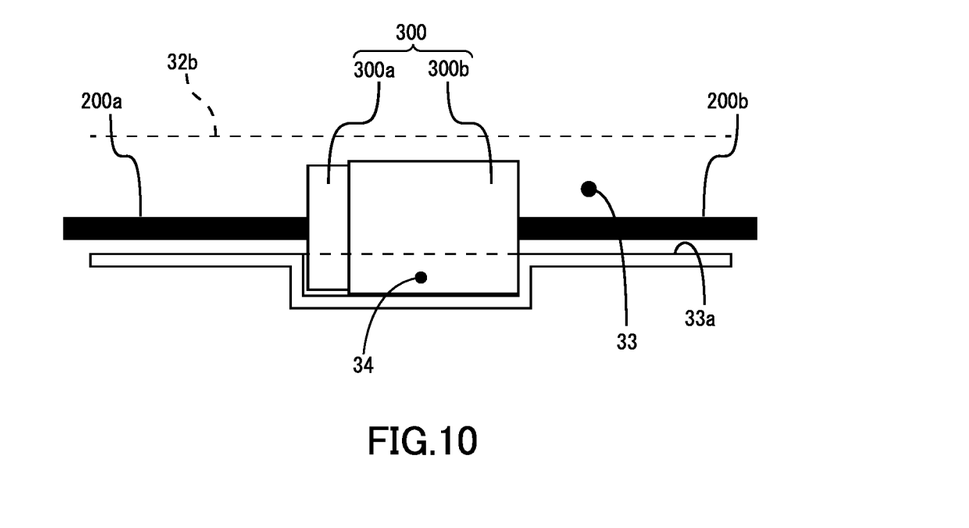
FIG. 10 is a cross-sectional view showing a connector storage portion shown in FIG. 9.

When cables are wired inside a robot mechanism, a plurality of cables may be connected in cascade via connectors. Therefore, the groove 33 provided in the separator plate 3 may be provided with a connector storage portion for storing the connectors. As shown in FIG. 9, as the connector storage portion 34, a bottom plate 33a of the groove 33 is provided with a recess having an inner shape that conforms to at least a part of the outer shape of a connector 300. The connector 300 refers to the entire connector with a first connector 200a at the end of a first cable 300a inserted into a second connector 200b at the end of a second cable 300b. The connector storage portion 34 may be provided on the side plate of the groove 33, or may extend from the bottom plate 33a to the side plate of the groove 33. As shown in FIG. 10, by providing the connector storage portion 34, the worker can fix the position and orientation of the connector 300 only by storing the connector 300 in the connector storage portion 34. This makes it possible to suppress variations in the cable wiring by the worker and achieve uniform quality as well as to improve workability. In addition, by providing the connector storage portion 34 with an inner shape that conforms to the outer shape of the connector 300, even when a force is applied to the connector 300 in a direction in which the connector 300 comes off for some reason, the connector 300 is held by the connector storage portion 34, so that the connector 300 can be prevented from coming off.

Second Embodiment

A protection member 7 for a wire member according to a second embodiment will be described below with reference to FIGS. 11 to 16.

The protection member 7 for the wire member according to the second embodiment comprises the separator plate 3 according to the first embodiment and a separator cover 5 that covers the separator plate 3, and by separating the cable 200 from the first and second structural parts 11 and 13 with the separator plate 3 and separating the cable 200 from the casing cover 20 with the separator cover 5, the risk of the cable 200 being rubbed against and damaged by the first and second structural parts 11 and 13 inside the casing 10 and the casing cover 20 can be avoided. In the second embodiment, the separator cover 5 will be mainly described, and the description of the separator plate 3 will be omitted. The surface of the separator cover 5 facing the separator plate 3 will be referred to as the back surface of the separator cover 5, and the surface of the separator cover 5 facing the casing cover 20 will be referred to as the front surface of the separator cover.

The separator cover 5 is a lid-like member that covers at least a part of the groove 33 provided in the separator plate 3. The separator cover 5 has a transverse sectional shape that conforms to the planar shape of the separator plate 3. By covering at least a part of the groove 33 of the separator plate 3 with the separator cover 5, the risk of the cable 200 coming out of the groove 33 of the separator plate 3, coming into contact with the casing cover 20, and being damaged can be reduced. At least one protrusion may be provided on the front surface of the separator cover 5 so that at least one point on the front surface of the separator cover 5 comes into contact with the inner surface of the casing cover 20. As a result, the positions of the separator plate 3 and the separator cover 5 can be fixed inside the casing 10 with the casing cover 20 covering the casing 10.

Typically, the separator cover 5 is made of a hard resin that is transparent to visible light. By adopting a structure in which the separator plate 3 is covered with the transparent or semi-transparent separator cover 5, the worker can confirm whether or not the cable 200 is pinched between the separator plate 3 and the separator cover 5 with the separator plate 3 covered with the separator cover 5. This reduces the risk of damage to the cable 200.

Figure 11:
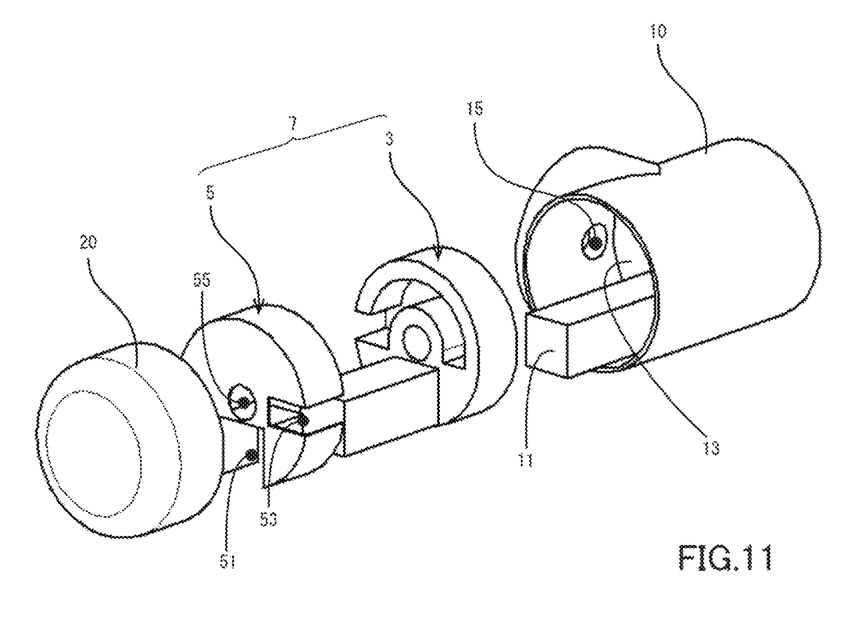
FIG. 11 is a perspective view showing a protection member for a wire member according to a second embodiment in a state where the joint of the robot shown in FIG. 1 is disassembled.
Figure 12:
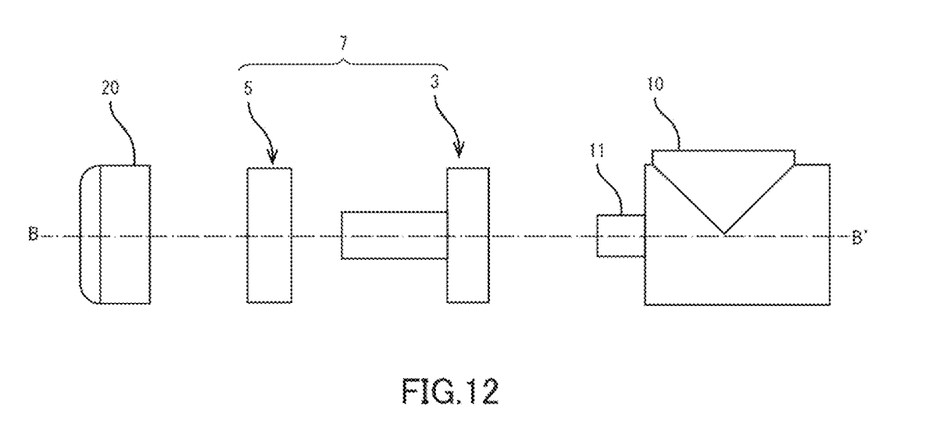
FIG. 12 is a plan view showing a state where the joint of the robot shown in FIG. 11 is disassembled.
Figure 13:
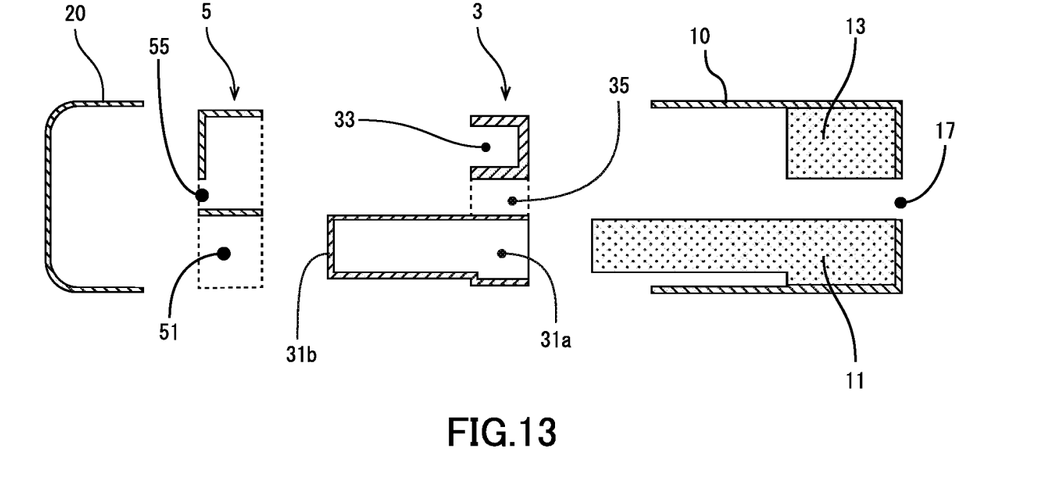
FIG. 13 is a B-B' cross-sectional view of a state where the joint of the robot shown in FIG. 12 is disassembled.
Figure 14:
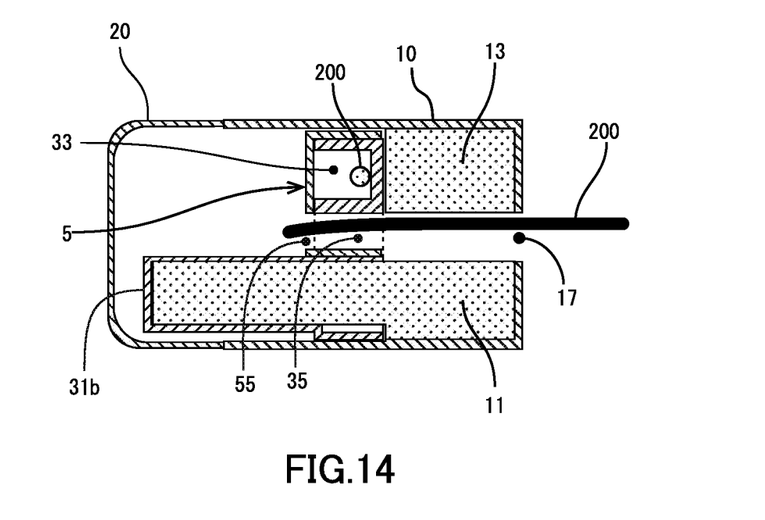
FIG. 14 is a cross-sectional view showing a state where the joint of the robot shown in FIG. 13 is assembled, together with a cable.
Figure 15:
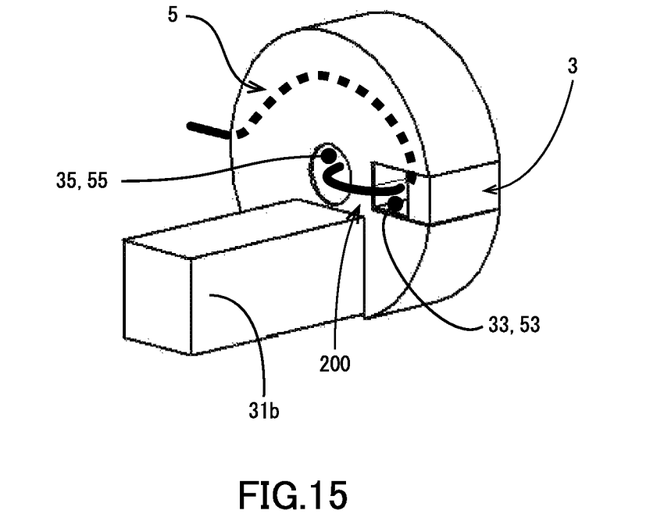
FIG. 15 is a perspective view showing a state where the separator plate shown in FIG. 11 is covered with a separator cover, together with a cable.
Figure 16:
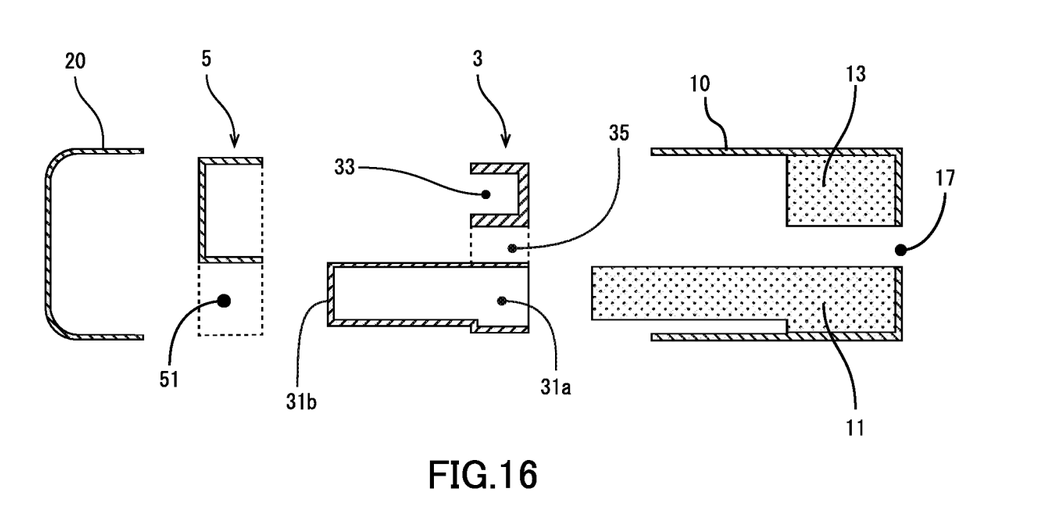
FIG. 16 is a cross-sectional view showing a protection member for a wire member according to a modification of the second embodiment.

As shown in FIG. 11, the separator cover 5 has a notch 51 through which the first structural part 11 is inserted, and a through hole 55 provided at a position aligned with the through hole 35 of the separator plate 3. In addition, as shown in FIG. 15, there is provided a drawing-out notch 53 for drawing out the cable 200 from the groove 33 of the separator plate 3 with the separator plate 3 covered with the separator cover 5. Of course, in order to completely physically separate the cable 200 from the casing cover 20, the separator cover 5 may be configured to cover the entire front surface of the separator plate 3 except for the protrusion 31*b* on the front surface side as shown in FIG. 16.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot subassembly comprising:
   a casing;
   a structural part and a cable accommodated inside the casing;
   a separator plate that separates the cable from the structural part; and
   a cover of the casing,
   wherein
   the separator plate has a back surface facing against the structural part, and a front surface facing away from the back surface;
   a bottomed-hollow-pillar structure protrudes from the front surface of the separator plate;
   the bottomed-hollow-pillar structure has an interior space passing through the separator plate and has an opening on the back surface of the separator plate, the opening facing against the structural part;
   the interior space and the opening of the bottomed-hollow-pillar structure comprises a concave portion to fit to the structural part;
   a groove is disposed on the front surface of the separator plate, the groove accommodating and routing the cable; and
   the groove is formed on the front surface side of the separator plate and avoids the bottomed-hollow pillar structure.

2. The robot subassembly according to claim 1, wherein a hole or a notch is formed to draw the cable from the back surface side to the front surface side.

3. The robot subassembly according to claim 1, wherein the groove is provided with a recess into which a connector of the cable is fitted.

4. The robot subassembly according to claim 1, further comprising:
   a separator cover configured to fit to the separator plate from a side of the cover of the casing and cover at least a part of the groove provided in the separator plate.

5. The robot subassembly according to claim 4, wherein the separator cover is transparent to visible light.

6. The robot subassembly according to claim 1, the robot subassembly further comprising another structural part housed in the casing,
   wherein a convex portion at the back surface side of the separator plate is configured to come into contact with the another structural part.

7. The robot subassembly according to claim 1, wherein, in a cross-section of the bottomed-hollow-pillar structure along an axis direction thereof, the concave portion fits to the structural part.

8. The robot subassembly according to claim 1, the robot subassembly further comprising another structural part housed in the casing,
   wherein:
   another bottomed-hollow-pillar structure protrudes from the front surface of the separator plate;
   the another bottomed-hollow-pillar structure has an interior space passing through the separator plate and has another opening on the back surface of the separator plate, the another opening facing against the another structural part;
   the interior space and the another opening of the another bottomed-hollow-pillar structure comprises another concave portion to fit to the another structural part; and
   the groove avoids both bottomed-hollow-pillar structure.

* * * * *